(59.)
H. H. Rueter. Corn Sheller Tooth.
No. 122,968. Patented Jan. 23, 1872.
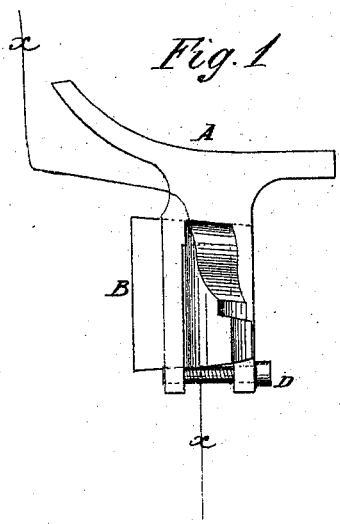
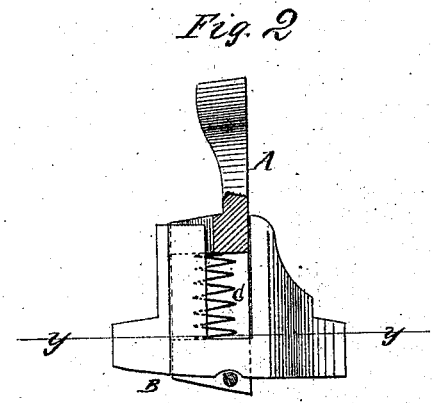
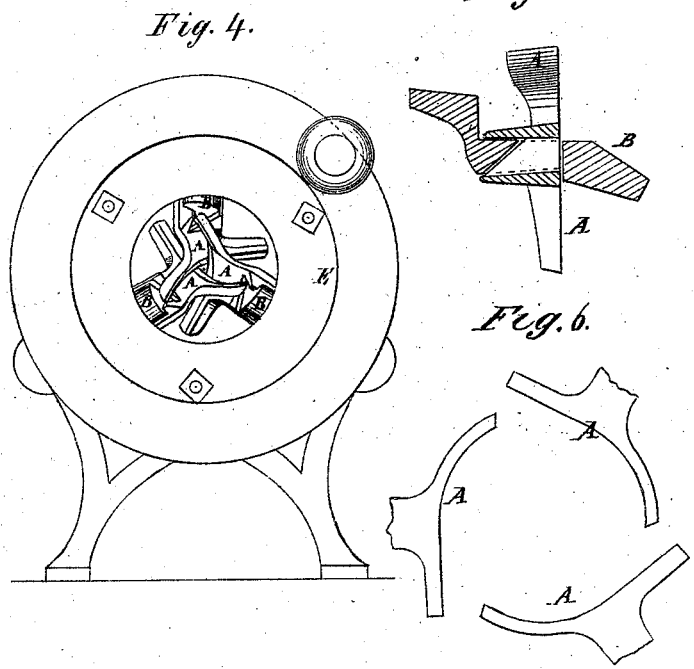
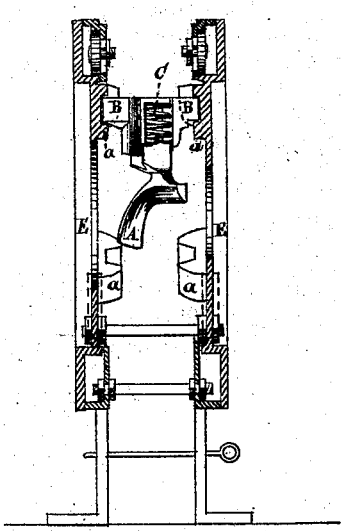
Witnesses:
A. W. Almqvist
Wm. H. C. Smith
Inventor:
H. H. Rueter.
Per Munn & Co
Attorneys.

UNITED STATES PATENT OFFICE.

HERMAN H. RUETER, OF NEW HOPE, MISSOURI.

IMPROVEMENT IN CORN-SHELLER TEETH.

Specification forming part of Letters Patent No. 122,968, dated January 23, 1872.

*To all whom it may concern:*

Be it known that I, HERMAN H. RUETER, of New Hope, in the county of Lincoln and State of Missouri, have invented a new and useful Improvement in Corn-Sheller Tooth; and I do hereby declare that the following is a full, clear, and exact description thereof, which will enable others skilled in the art to make and use the same, reference being had to the accompanying drawing forming part of this specification.

This invention relates to a new and useful improvement in teeth for corn-shellers, whereby the ordinary corn-sheller is rendered more effective than heretofore; and it consists in the construction and arrangement of parts hereinafter described.

In the accompanying drawing, Figure 1 is a top view of the corn-sheller tooth. Fig. 2 is a section of Fig. 1 on the line $x\, x$. Fig. 3 is a section of Fig. 2 on the line $y\, y$. Fig. 4 shows a side elevation of a complete corn-shelling machine provided with my improved teeth, represented in the position they occupy previous to insertion of an ear of corn; Fig. 5, a cross-section of the same. Fig. 6 represents the position of the teeth with relation to each other when the same are drawn back, or more widely separated than in Fig. 4.

Similar letters of reference indicate corresponding parts.

Three of these teeth are used in the corn-sheller, arranged as indicated in Figs. 4 and 6, the side and edge views being shown in Figs. 1 and 2. The tooth is made in two parts, A and B, the former being the tooth proper, or part with which the corn comes in contact. The part A is locked to B, and the formation of the parts is such that a recess is left within the lock in which the spiral spring C is placed. The part B is fixed in the head E or revolving portion of the machine by means of lugs $a\, a$, and the tendency of the spiral spring is to force the parts of the tooth asunder, but this separation of the parts is prevented by the screw D, which acts as a stop to limit the action of the spring. The part A, it will be seen, is made, by this arrangement, elastic, which allows it to give and conform to the size of the ear of corn. The teeth are placed in the machine so as to act together with inclined upper surfaces E, arranged to act as a screw to draw the cob through while taking off the kernels.

Having thus described my invention, I claim as new and desire to secure by Letters Patent—

The combination of the forked tooth A, recessed socket-piece B, and spring C, constructed and arranged as specified.

H. H. RUETER.

Witnesses:
   CHARLTON KOACH,
   JOS. T. NICKLIN.